(No Model.)
J. E. GILL.
LUBRICATING OIL.
No. 296,159. Patented Apr. 1, 1884.
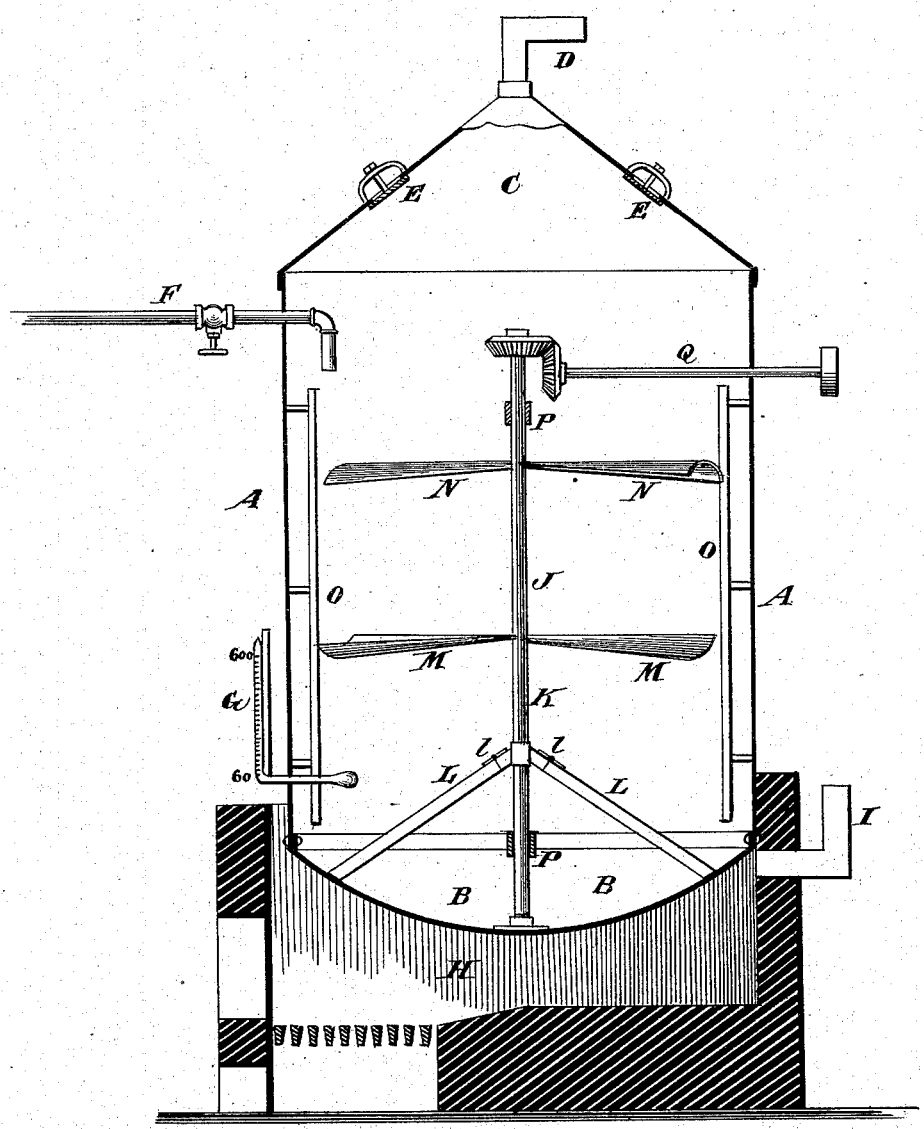
Witnesses:
A. Ruppert,
E. Cruse
Inventor:
John E. Gill,
by Gott W. T. Morris
attys

UNITED STATES PATENT OFFICE.

JOHN E. GILL, OF FRANKLIN, PENNSYLVANIA.

LUBRICATING-OIL.

SPECIFICATION forming part of Letters Patent No. 296,159, dated April 1, 1884.

Application filed February 7, 1884. (No model.)

*To all whom it may concern:*

Be it known that I, JOHN E. GILL, of Franklin, in the county of Venango, in the State of Pennsylvania, have invented two new Lubricating-Oils and new and useful Improvements in Processes for Making Lubricating-Oils, (which improvements, jointly and severally, are new and useful alike in the manufacture of my said new oils, and also in the several processes heretofore patented and practiced for the manufacture of lubricating-oils by the combination of mineral oils with animal or vegetable oils and the oxides or the carbonates of lead, which are the constituent elements of my said new oils,) of which the following is a specification.

It is well known that a chemical reaction cannot be produced between mineral oil and plumbum, and prior to the date of my first invention herein set forth vain attempts have been made to unite mineral oil with lead soap, (a combination of plumbum and animal or vegetable oil,) so as to produce lubricating-oils in which the chemical reaction and the solution shall be complete and of predetermined density and color, as set forth—for example, in Letters Patent of the United States numbered 90,100 and 197,129.

My invention consists, generally—

First, (and thereby with the aid of any of the subsequent steps in the different well-known processes for making lubricating-oils I produce a new oil,) in this, that when the applied heat shall have raised the temperature of the lead soap or mixture of the oxides, or the carbonates of lead and animal or vegetable oil, to a temperature of 350° to 380° Fahrenheit, when a more or less sudden and vigorous rise of temperature will occur from the latent heat of the mixture even if the applied heat be then entirely withdrawn, I utilize said latent heat, and, if necessary, add to the applied heat till I have forced the temperature to 475° to 500° Fahrenheit, and, instead of either then slackening or withdrawing the fire or then adding a cooling fluid, by regulating the applied heat I hold the mixture at that high temperature for fifteen minutes or more, according to the consistency desired in the resulting oil, thereby producing practically a complete chemical reaction in the mixture, which practically will not precipitate its lead in the mineral oil, with which it, after the said process, can be more successfully united in solution.

Second. In treating the compound of animal or vegetable oil and lead, whether prepared by my improved process or otherwise, when completed and before it is allowed to cool to any considerable extent, with a strong flow or current of mineral oil, either crude or prepared, at a low temperature, the applied heat being retained, the gradual cooling effect of the flow or current permitting, if desired, a continuance of the chemical reaction between the elements of the compound, and its too rapid cooling (which by reason of thickening the compound would render it more liable to be scorched) being thus prevented. Another object of heating the mineral oil to be introduced is that thereby the water, if any, is evaporated therefrom or precipitated therein, and foreign substances—such as sand—are precipitated in the vessel used for preparing the mineral oil.

Third. After said compound is prepared, either by my improved process or otherwise, and has been treated by an inflow of mineral oil, either in a strong current or flow at a low temperature, or otherwise, for five or ten minutes—that is, until the temperature of the mixture shall have been reduced to 340° to 320° Fahrenheit—in stopping said inflow of mineral oil and maintaining the temperature of the mixture at about 340° to 320° Fahrenheit for about ten or fifteen minutes. My objects in this third process are as follows: first, that if the quality or proportions of the constituents of the first compound shall be such that whatever process for its reaction shall have been employed its reaction shall not have become perfect, it will by this process be made perfect; second, I have discovered that said first compound will be held in solution in the mineral oil much better if a part only of the mineral oil to be added is first introduced and then the mixture be allowed to remain for about the time and about the temperature stated; third, if carbonate of lead, $PbCO_3$, be used in the first compound, it is well known that when held sufficiently long at a temperature of 170° centigrade, or, say, of 340° to 320° Fahrenheit, this carbonate will lose $CO_2$ and become PbO, or the first oxide of lead, commonly called "litharge," and this third process aids and completes that chemical change.

Fourth. In producing an oil of greater density, especially adapted for summer use, by raising the temperature of the said lead soap or first compound, as above described, to a temperature of 475° to 500° Fahrenheit, keeping it at that temperature, as above described, for ten or fifteen minutes, and then adding a strong flow of petroleum until the temperature shall have been gradually reduced between 20° and 30°, and in then stopping the inflow of petroleum and increasing the applied heat until the temperature shall have been raised about the amount which it had been reduced—to wit, between 20° and 30°—when it is held at the temperature thus attained for several minutes before the flow of petroleum is again added, as herein described.

Fifth. These specifications will describe improvements in apparatus for practicing the above processes or either of them, and specially the stirrer K, having the arms L, M, and N, and the said stirrer, in combination with the strips O, secured to the sides of the tank; but these improvements will form the subject-matter of a separate application for Letters Patent.

By the use of the several processes hereinabove described I am able to produce a lubricating-oil free from precipitate and practically of any predetermined density and color, and also to increase the product resulting from any given amounts of raw materials very largely indeed.

A description of an apparatus for and the practical use of the said processes, reference being had to the accompanying drawing, is as follows:

A is a tank, of boiler-iron, of a capacity of from one hundred to two hundred barrels.

B is the concave bottom.

C is the conical closely-fitting cover, provided with a flue, D, for the exit of the vapors either into the open air or suitable condensers connected therewith.

E are openings in the cover, for entrance into the tank when it is desired to clean it. The tank is provided with one or more pipes, F, for the introduction of the oil, and with a thermometer, G, placed on the outside, forming an elbow, with the bulb inside the tank, for the purpose of indicating the temperature of the contained liquid. The thermometer, which is placed in front, near the furnace H, is graduated to indicate a heat varying from 60° Fahrenheit to 600° Fahrenheit. The furnace H, built under the tank, is about sixteen to eighteen inches high, and has its brickwork carried up for a foot or two all around the outside of the tank, leaving a space in front of about ten inches, where the thermometer is placed, as indicated in the drawing.

I is the smoke-flue of the furnace.

J is a stirrer placed within the tank, and consists of the upright shaft K, having iron arms L M N, for stirring the liquid. Arms L project down, so as to scrape the bottom of the tank, and are hinged at $l$, to allow them to rise over any inequality of the bottom. Arms M are constructed to throw the liquid up, and arms N to throw it down, their action being somewhat after the manner of a screw-propeller. Strips of boiler-iron O, about six inches wide, extend from the top of the tank to within a foot of the bottom. A space of about two inches is left between the sides of the tank and the strip. The strips serve as breakers to throw the oil or grease toward the center of the tank, in order to have it thoroughly mixed.

P P are braces which hold the stirrer in place. A shaft, Q, passes through the tank near the top, and is provided at one end with a cog-wheel, gearing into a corresponding cog-wheel on the stirrer, while the other end is mounted with suitable appliances for revolving the shaft and with it the stirrer. Place about six hundred (600) pounds of pure ground dry white lead, with from eighty (80) to one hundred (100) gallons of vegetable or animal oil, in the tank, which is then closed. The mixing apparatus, already described, is started, and at the same time a steady heat is applied to the tank and its contents until the temperature rises in the course of two hours to from 350° to 380° Fahrenheit, when the heat of the mixture begins to rise rapidly, without any additional firing, to about 450° Fahrenheit. At this point the fire is allowed to slacken, unless the temperature stops rising, in which case the fire is increased, and the mixture forced up to from 475° Fahrenheit to 500° Fahrenheit, which it ought to attain inside of fifteen minutes, where it is held for about the same length of time, according to the consistency which it is desired the liquid should have. After holding the oil, as described, in the neighborhood of 470° Fahrenheit to 500° Fahrenheit for the time specified, a strong flow of crude petroleum, or of some product of petroleum, having a temperature of 100° to 150° Fahrenheit, is turned on, through the pipes provided for that purpose in the top of the tank, in a sufficient quantity and for a sufficient time (unless the process above described for making a summer-oil of greater density be here introduced) to cause the temperature to decline gradually to between 340° Fahrenheit to 320° Fahrenheit, a good fire being maintained under the tank all the time. I have found that a pipe having a diameter of from two to two and one-half inches will give a flow sufficient for the quantity of the mixture assumed in this instance. The flow of oil is now cut off for a space of ten to fifteen minutes, the heat of the mixture being held at the last-named temperature, (340° to 320° Fahrenheit,) when the oil is again allowed to flow in until the desired gravity of the mixture is reached. The flow of oil is now stopped, and the contents of the tank, after being stirred for about an hour, are pumped over into vats for bleaching.

I prefer red lead to either litharge or a carbonate of lead when using mineral oil of dark colors, and I prefer to use either carbonate or white lead to either litharge or red lead when using mineral oil of a light color. I have also discovered that it is important that the added mineral oil should first be heated to a comparatively low temperature, as indicated, and for a dark-colored oil I prefer it to be at about 140° to 150° Fahrenheit, or even higher, and for a light-colored oil at about 80° to 120° Fahrenheit. Ordinary skill in the handling this inflow of petroleum under the specifications already herein given will enable the operator to control perfectly the temperature at all times of the first compound, to thereby make a more perfect union between its elements, to prevent its burning, and to produce a more valuable lubricating-oil. After a sufficient inflow of mineral oil at a comparatively low temperature shall have reduced the temperature of the compound to 340° to 320° Fahrenheit, and after the same shall have been maintained at said temperature for, say, fifteen minutes, mineral oil which had not been previously heated may be introduced, but not with practically as good results as if such additional oil last introduced had been previously treated as set forth.

I do not claim the compound of oils with the oxide of lead produced by the process described and claimed in said patent numbered 90,100, nor the compound of oils with white lead of commerce, produced by the mechanical process described and claimed in said patent numbered 197,129, neither of which processes will answer my present purpose; nor do I confine myself to any proportions, nor to any specific and exact temperatures; but

What I claim as new, and desire to secure by Letters Patent, is—

1. In the manufacture of lubricating-oils composed of mineral oil added to a compound of animal or vegetable oil and an oxide or a carbonate of lead, the process of first raising said compound to and holding it at a temperature of about 480° Fahrenheit, and then, by adding a flow of mineral oil, reducing said temperature about 20°, and then raising same to the said high temperature, then holding the mixture at said high temperature for several minutes, for the purpose set forth.

2. A lubricating-oil composed of a compound of mineral or vegetable oil, and either an oxide or a carbonate of lead to which mineral oil is subsequently added, said compound being first raised to a temperature of about 480° to 500° Fahrenheit, then reduced by adding mineral oil about 20°, and then raised again to the first high temperature before the rest of the mineral oil to be added is introduced.

3. In the manufacture of lubricating-oils composed of the elements named, the said compound being subjected to heat which will raise its temperature by regulating the applied heat to 475° to 500° Fahrenheit, and of holding it at that high temperature for fifteen minutes or more, according to the consistency desired, all before the mineral oil is introduced, and as and for the purposes set forth.

4. A lubricating-oil composed of a compound of animal or vegetable oil and an oxide or a carbonate of lead, said compound being forced to a temperature of 475° to 500° Fahrenheit, and held at that high temperature for fifteen minutes or more, according to the consistency desired, and then united with mineral oil, substantially as and for the purpose described.

5. In the manufacture of lubricating-oils from the elements named, the process of treating said compound with a strong inflow of mineral oil of a temperature of 80° to 150° Fahrenheit, substantially as and for the purpose described.

6. In the manufacture of lubricating-oils from the elements named, the process of stopping said inflow of previously-heated mineral oil when the temperature of said compound and added oil shall have been reduced to 340° to 320° Fahrenheit, and maintaining about said temperature for about ten or fifteen minutes, substantially as and for the purpose set forth.

7. The improvement in the process of preparing lubricating-oils which consists in maintaining the fire during the addition of the cooling oil, whereby the cooling of the mixture is effected gradually.

8. In the manufacture of lubricating-oils from a compound of animal or vegetable oil with an oxide or a carbonate of lead, to which, after treatment, mineral oil is added, the process of first forcing the temperature of said compound to 475° to 500° Fahrenheit, of holding it at that high temperature for fifteen minutes or more, according to the consistency desired, then adding a strong inflow of mineral oil previously heated to 80° to 150° Fahrenheit, until, the fire being maintained and regulated, the temperature shall be reduced to 340° to 320° Fahrenheit, and maintaining said last-mentioned temperature for about ten or fifteen minutes, and then adding mineral oil as desired, all substantially as and for the purpose set forth.

9. A lubricating-oil composed of animal or vegetable oil and an oxide or carbonate of lead and mineral oil, produced by the following processes, substantially as herein described, to wit: making a compound of the animal or vegetable oil with the oxide or carbonate of lead, and, by regulating the applied heat, forcing the temperature thereof to 475° to 500° Fahrenheit, and holding the mixture at that high temperature for fifteen minutes or more, according to the consistency desired in the resulting oil, and then treating said compound, before it is allowed to cool to any considerable extent, with a strong flow of mineral oil at a low temperature, the applied heat being retained until the temperature shall be reduced to 340° to 320° Fahrenheit, and stopping said inflow and maintaining said last-mentioned temperature for about ten or fifteen minutes, and in then introducing the desired quantity of mineral oil, the cooling of the compound and mixture being made gradual, and being regulated substantially as and for the purpose described.

In witness whereof I have hereto set my hand.

JOHN E. GILL.

Witnesses:
J. H. RAYMOND,
D. D. MALLORY.